US007690211B2

(12) United States Patent
Sakurai et al.

(10) Patent No.: US 7,690,211 B2
(45) Date of Patent: Apr. 6, 2010

(54) REFRIGERATING APPARATUS

(75) Inventors: Takashi Sakurai, Yaizu (JP); Kazumasa Ohta, Shizuoka (JP)

(73) Assignee: Hitachi Appliances, Inc. (JP)

( * ) Notice: Subject to any disclaimer, the term of this patent is extended or adjusted under 35 U.S.C. 154(b) by 866 days.

(21) Appl. No.: 11/524,961

(22) Filed: Sep. 22, 2006

(65) Prior Publication Data

US 2007/0107451 A1 May 17, 2007

(30) Foreign Application Priority Data

Nov. 15, 2005 (JP) ............................ 2005-330167

(51) Int. Cl.
*F25B 49/00* (2006.01)
*F25B 1/00* (2006.01)
*F25B 41/00* (2006.01)

(52) U.S. Cl. ...................... 62/197; 62/228.3; 62/228.5; 62/513

(58) Field of Classification Search ................ 62/196.1, 62/197, 228.3, 228.5, 513
See application file for complete search history.

(56) References Cited

U.S. PATENT DOCUMENTS 5,062,274 A 11/1991 Shaw
5,626,027 A 5/1997 Dormer et al.
6,009,715 A 1/2000 Sakurai et al.
6,189,335 B1 * 2/2001 Ebara et al. ................... 62/510
6,330,804 B1 12/2001 Uno et al.
6,701,730 B2 * 3/2004 Sakurai et al. ................ 62/197
7,316,120 B2 * 1/2008 Aoki et al. ................. 62/324.4
2007/0074536 A1 * 4/2007 Bai ............................ 62/513
2009/0056358 A1 * 3/2009 Kotani et al. ............... 62/259.1

FOREIGN PATENT DOCUMENTS

CN 1 142 596 2/1997

(Continued)

OTHER PUBLICATIONS

Chinese Office Action of Application No. 2006101413115.

(Continued)

*Primary Examiner*—Marc E Norman
(74) *Attorney, Agent, or Firm*—Antonelli, Terry, Stout & Kraus, LLP.

(57) ABSTRACT

To provide a refrigerating apparatus that can control the supercooling degree of liquid refrigerant irrespective of changes in circulating refrigerant amounts in a refrigeration cycle, a refrigerating apparatus includes a refrigeration cycle having one or more compressors or inverter compressor, a condenser, an expansion valve, and an evaporator; a liquid introduction circuit that guides decompressed refrigerant obtained by extracting one part of high pressure liquid refrigerant from the refrigeration cycle and decompressing, to a supercooling heat exchanger provided in the refrigeration cycle to perform heat transfer between the decompressed refrigerant and high pressure liquid refrigerant, and then introduces the refrigerant into refrigerant for intake into the compressors or inverter compressor or an intermediate pressure part of these compressors; a controller controlling shutdown of the compressors or driving frequencies of the inverter compressor based on suction pressure detection values with respect to pressure setting values for suction pressure of the compressors or inverter compressor; and a flow controller controlling the amount of high pressure liquid refrigerant flowing through the liquid introduction circuit based on the circulating volume of refrigerant in the refrigeration cycle.

6 Claims, 3 Drawing Sheets

4 4a 10 3 4b 14 11 18 13 12 15 19 5 8 6 16 19 17 2 7 1 101 202 203 201 I II

FOREIGN PATENT DOCUMENTS

| | | |
|---|---|---|
| CN | 1266975 | 9/2000 |
| JP | 09-196480 | 7/1997 |
| JP | 10-259962 | 9/1998 |
| JP | 2000-146316 | 5/2000 |
| JP | 2003-21408 | 1/2003 |
| JP | 2003-279169 | 10/2003 |
| JP | 2004-317034 | 11/2004 |
| JP | 2005-121246 | 5/2005 |

OTHER PUBLICATIONS

An Office Action of Japanese Application No. 2005-330167 dated Apr. 28, 2009.

* cited by examiner

I
II
1
2
3
4
4a
4b
5
6
7
8
10
11
12
13
14
15
16
17
18
19
101
201
202
203

⟨RELATION BETWEEN SUCTION PRESSURE OF MULTI REFRIGERATOR AND NUMBER OF OPERATING COMPRESSIONS⟩

FIG.3

〈WITH OR WITHOUT PERFORMANCE OF CONTROL ACCORDING TO PRESSURE SETTING VALUES〉

○: CONTROL ×: NO CONTROL

| INTENDED USE | No. | A VALUE | B VALUE | C VALUE | VALUE CONTROL |
|---|---|---|---|---|---|
| COLD STORAGE | 1 | 0.15 | 0.28 | 0.38 | ○ |
| | 2 | 0.09 | 0.21 | 0.33 | ○ |
| | 3 | 0.09 | 0.17 | 0.28 | ○ |
| | 4 | 0.03 | 0.15 | 0.24 | ○ |
| | 5 | 0.03 | 0.11 | 0.21 | ○ |
| | 6 | -0.02 | 0.08 | 0.15 | ○ |
| FREEZER STORAGE | 7 | -0.02 | 0.05 | 0.12 | × |
| | 8 | -0.02 | 0.01 | 0.09 | × |
| | 9 | -0.02 | 0.01 | 0.06 | × |

A VALUE : SHUT DOWN PRESSURE VALUE
B VALUE : SETTING VALUE TO REDUCE FREQUENCY OR NUMBER OF OPERATING COMPRESSORS
C VALUE : SETTING VALUE TO INCREASE FREQUENCY OR NUMBER OF OPERATING COMPRESSORS

FIG.4

〈WITH OR WITHOUT PERFORMANCE OF CONTROL ACCORDING TO NUMBER OF OPERATING COMPRESSOR UNITS OF MULTI REFRIGERATOR〉

○: CONTROL ×: NO CONTROL

| OPERATING STATUS/ NUMBER OF COMPRESSORS | 2 COMPRESSORS | 3 COMPRESSORS | 4 COMPRESSORS |
|---|---|---|---|
| WHEN ONE COMPRESSOR IS OPERATING | × | × | × |
| WHEN TWO COMPRESSORS ARE OPERATING | ○ | ○ | × |
| WHEN THREE COMPRESSORS ARE OPERATING | — | ○ | ○ |
| WHEN FOUR COMPRESSORS ARE OPERATING | — | — | ○ |

REFRIGERATING APPARATUS

INCORPORATION BY REFERENCE

The present application claims priority from Japanese application JP2005-330167 filed on Nov. 15, 2005, the content of which is hereby incorporated by reference into this application.

BACKGROUND OF THE INVENTION (1) Field of the Invention

The present invention relates to a refrigerating apparatus, and more particularly to technology for controlling the degree of supercooling of liquid refrigerant in a refrigeration cycle.

(2) Description of Related Art

Conventionally, a refrigerating apparatus uses a refrigeration cycle configured by connecting a compressor, a condenser, an expansion valve and an evaporator in this order by refrigerant piping.

In this refrigeration cycle, after low pressure refrigerant that was drawn into the compressor is compressed to a predetermined high pressure, the refrigerant is guided to the condenser and changed into high pressure liquid refrigerant, by the heat exchange with air. This high pressure liquid refrigerant is guided to the expansion valve and expanded, and then sent to the evaporator to be changed to low pressure gas refrigerant, by heat exchange with air to be cooled or with fluid for cooling such as water. Thereafter, the low pressure gas refrigerant is drawn into the compressor and compressed again to repeat the above described refrigeration cycle.

As the condenser in the refrigeration cycle, an air cooled condenser conducting heat exchange between refrigerant and air blown into the condenser is generally used. However, the degree of supercooling of liquid refrigerant that is condensated by this kind of condenser is low at approximately 1° C., and the degree of supercooling may be zero depending on the operating conditions. Therefore, if the liquid-refrigerant does not retain a sufficient degree of supercooling there is a risk of the liquid refrigerant re-evaporating (hereafter, referred to as "flush phenomenon") due to pressure loss or the like in the liquid refrigerant piping that follows the condenser.

Particularly, HFC refrigerants (for example, R-404A) that are attracting attention in recent years because of environmental concerns are difficult to be supercooled since, in terms of the physical properties of the refrigerants, their volume flow rate is large compared to HCFC refrigerants (for example, R-22). Further, since the circulating volume flow rate of an HFC refrigerant increases compared to, for example, R-22, the volume of refrigerant increases, pressure loss rises, and a flush phenomenon is liable to occur. Examples of problems when a flush phenomenon occurs in liquid refrigerant piping in the refrigeration cycle include a noticeable drop in refrigerating capacity and overfilling of refrigerant when performing an operation to fill refrigerant while viewing the status of flush gas occurrence with a sight glass when performing trial operation for a unit.

Therefore, in order to control this type of flush phenomenon, a refrigerating apparatus has been disclosed that ensures the degree of supercooling of liquid refrigerant reaches a predetermined level by providing a supercooling heat exchanger partway along the liquid refrigerant piping that follows the condenser, and after extracting and decompressing one part of liquid refrigerant from the liquid refrigerant piping on the flow side thereafter, guides the refrigerant to the supercooling heat exchanger to experience heat exchange with high pressure liquid refrigerant (see FIG. 1 of JP-A-2003-279169).

Further, a refrigerating apparatus is known that comprises a plurality of fixed capacity compressors or variable capacity-type inverter compressor and controls the capacity by regulating the number of operating compressors or the driving frequency in accordance with load changes. However, the circulating amount of refrigerant varies greatly when this kind of capacity control is performed. When this kind of control is applied to, for example, the refrigerating apparatus disclosed in JP-A-2003-279169, it becomes necessary to control the degree of supercooling of liquid refrigerant by a supercooling heat exchanger in accordance with variations in the circulating amount of refrigerant. However, no studies have been carried out heretofore regarding this point.

Therefore, for example, when the evaporation temperature of the evaporator is set low or when the circulating amount of refrigerant in the refrigeration cycle becomes low in the case of a small load, an amount of decompressed refrigerant to be evaporated for supercooling is greater than the required amount flows into the supercooling heat exchanger. More specifically, with respect to the high pressure liquid refrigerant and decompressed refrigerant flowing through the supercooling heat exchanger, since the decompressed refrigerant occupies a greater part of the flow ratio, the heat exchange efficiency of the supercooling heat exchanger decreases and evaporation of the decompressed refrigerant in the supercooling heat exchanger is insufficient. Consequently, the degree of suction gas superheating and the degree of discharge gas superheating of the compressor decreases. Further, in the supercooling heat exchanger, there is a risk of a freeze burst occurring due to overcooling, and a refrigerant gas leak or the like being generated as a result thereof.

It is an object of the present invention to provide a refrigerating apparatus that can control the degree of supercooling of liquid refrigerant irrespective of the circulating volume of refrigerant in the refrigeration cycle.

SUMMARY OF THE INVENTION

To solve the above described problem, according to this invention there is provided a refrigerating apparatus comprising: a refrigeration cycle having one or more compressors or inverter compressor, a condenser, an expansion valve and an evaporator; a liquid introduction circuit that, after guiding decompressed refrigerant obtained by extracting one part of high pressure liquid refrigerant from the refrigeration cycle and decompressing, to a supercooling heat exchanger provided in the refrigeration cycle and causing the decompressed refrigerant to experience heat transfer with the high pressure liquid refrigerant, introduces the decompressed refrigerant into refrigerant to be drawn into the compressors or the inverter compressor or an intermediate pressure part of these compressors; control means that controls a driving frequency of an inverter compressor or shutdown of a compressor based on a detection value for suction pressure with respect to a pressure setting value for suction pressure of a compressor or inverter compressor; and flow control means that controls a flow amount of high pressure liquid refrigerant that flows through the liquid introduction circuit based on a circulating volume of refrigerant in the refrigeration cycle.

More specifically, the flow amount of decompressed refrigerant that is introduced into the supercooling heat exchanger can be regulated by changing the flow amount of high pressure liquid refrigerant that is introduced into the liquid introduction circuit. Therefore, by controlling the flow of high pressure liquid refrigerant in the liquid introduction circuit based on the circulating volume of refrigerant in the refrigeration cycle, even if the circulating volume of refrigerant varies due to changes in the evaporating temperature used by the evaporator or the load or the like, the high pressure liquid refrigerant in the refrigeration cycle can be controlled to a desired degree of supercooling Hence, according to the present invention it is possible to suppress a flush phenomenon or the like that are accompanied by an increase in the circulating volume of refrigerant, and obtain a stable operating state and high operating efficiency.

Further, for example, only one fixed capacity compressor may be provided in the refrigeration cycle, or a plurality of compressors may be provided in parallel therein. That is, when providing only one fixed capacity compressor, control is performed to switch between operation and shutdown of that compressor, and when a plurality of compressors are provided control is carried out to switch between operation and shutdown of selected compressors.

In this case, for example, the refrigeration cycle may comprise a plurality of compressors or inverter compressor, and flow control means may control the flow amount of high pressure liquid refrigerant that flows through the liquid introduction circuit in accordance with shutdown of compressors or the driving frequency of an inverter compressor.

Further, an HFC-type quasi-azeotropic (pseudo-azeotropic) mixture refrigerant can be used as the refrigerant to be filled in the refrigeration cycle. As well known, the quasi-azeotropic mixture refrigerant is a kind of zeotrope mixture refrigerant.

According to the refrigerating apparatus of this invention, since the degree of supercooling of liquid refrigerant can be controlled irrespective of the circulating volume of refrigerant in the refrigeration cycle, it is possible to obtain a stable operating state and high operating efficiency.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 3 is a view for explaining one embodiment of flow control of a liquid introduction circuit in a multi refrigerator that includes a plurality of compressors; and FIG. 4 is a view for explaining one embodiment of flow control of a liquid introduction circuit in a multi refrigerator that includes a plurality of compressors.

DETAILED DESCRIPTION OF THE INVENTION

Figure 1:
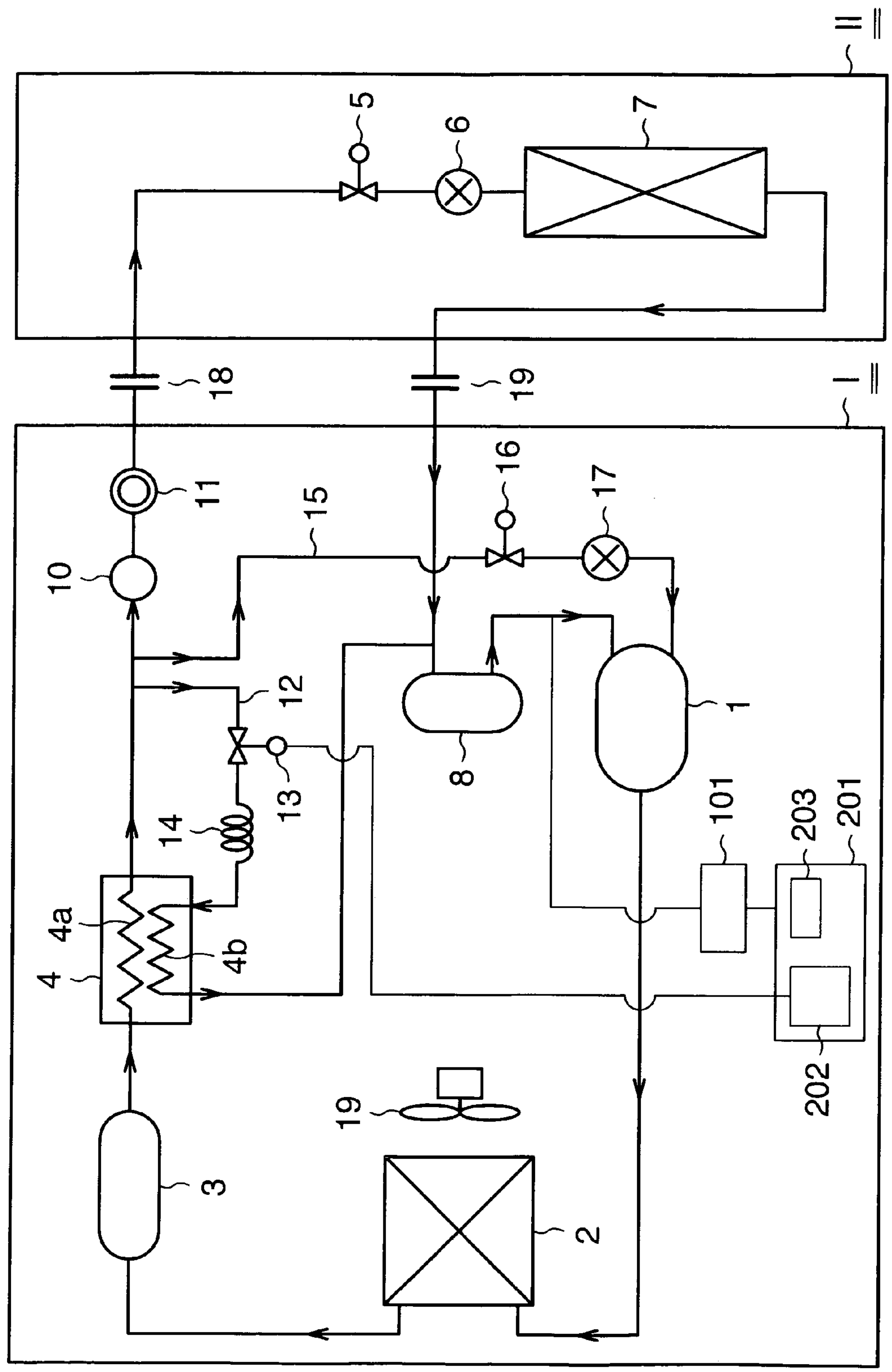
FIG. 1 is a block diagram that shows the refrigeration cycle of a refrigerating apparatus that applies this invention.

Hereunder, embodiments of the refrigerating apparatus of this invention are described using the attached drawings. FIG. 1 is a block diagram that shows the refrigeration cycle of a refrigerating apparatus applying this invention.

In this figure, the refrigerating apparatus of the present embodiment comprises a refrigeration cycle and a control apparatus. The refrigeration cycle has an air-cooled integrated type refrigerating apparatus I and a low-pressure side device II connected to the apparatus I.

The air-cooled integrated type refrigerating apparatus I comprises an accumulator 8, a compressor 1, a condenser 2, a liquid receiver 3, a supercooling heat exchanger 4, a dryer 10, and a sight glass 11 that are connected in this order by refrigerant piping, and a cooling fan 9 is disposed in the vicinity of the condenser 2. The low-pressure side device II comprises a solenoid valve 5, an expansion valve 6 and an evaporator 7 that are connected in this order by refrigerant piping. The sight glass 11 and the solenoid valve 5 are connected by refrigerant piping through a pipe connector 18, while the evaporator 7 and the accumulator 8 are connected by refrigerant piping through a pipe connector 19, so that the refrigeration cycle is formed. For example, HFC-type quasi-azeotropic mixture refrigerant is filled in this refrigeration cycle.

A scroll compressor is used as the above described compressor 1. For example, a fixed capacity compressor (constant speed type) that is driven with a commercial power source or a variable capacity compressor that can change capacity by adjusting the driving frequency by an inverter system is used. Although this embodiment describes an example in which only one variable capacity-type inverter compressor is provided as the compressor 1, the invention is not limited thereto, and for example a plurality of fixed capacity compressors 1 may be disposed in parallel may be used.

An unshown discharge port is provided in the refrigerant piping on the downstream side of the supercooling heat exchanger 4. A branch pipe is connected to this discharge port to form a liquid introduction circuit 12. A solenoid valve 13 and a decompression device 14 are provided in this order in the liquid introduction circuit 12 so that high pressure liquid refrigerant that was extracted from the refrigerant piping is decompressed to form decompressed refrigerant, the decompressed refrigerant is guided to the supercooling heat exchanger 4 for heat exchange with high pressure liquid refrigerant, and after evaporation is introduced into the entry side of the accumulator 8. The solenoid valve 13 and decompression device 14 regulate the flow of refrigerant flowing within the liquid introduction circuit 12, and although an expansion valve or capillary tube is generally used, an electronic expansion valve that can freely regulate the flow rate may also be used.

The supercooling heat exchanger 4 is configured to apply supercooling to high pressure liquid refrigerant by subjecting high pressure liquid refrigerant introduced from the condenser 2 to a heat exchange process with decompressed refrigerant introduced from the liquid introduction circuit 12. More specifically, the supercooling heat exchanger 4 comprises a high pressure refrigerant heat exchanger tube 4*a* in which the high pressure liquid refrigerant flows and a decompressed refrigerant exchanger tube 4*b* in which expanded refrigerant from the liquid introduction circuit 12 flows. These two heat exchanger tubes are disposed adjacent to each other so that the two kinds of refrigerant can exchange heat.

Another unshown discharge port is provided in the refrigerant piping further downstream of the discharge port of the liquid introduction circuit 12. A branch pipe is connected to this discharge port to form a liquid refrigerant circuit 15. A solenoid valve 16 and a decompression device 17 are provided in this order in this liquid introduction circuit 15 so that high pressure liquid refrigerant that is extracted from the refrigerant piping is decompressed and then introduced into an intermediate pressure part of the compressor 1 to cool the compressor 1. The decompression device 17 is a device that regulates the flow of refrigerant flowing within the circuit, and although an expansion valve or capillary tube is generally used, an electronic expansion valve that can freely regulate the flow rate may also be used.

A setting device 202 and a setting display 203 are integrated into a controller 201 that is the control apparatus of the refrigeration cycle. A detecting portion of a suction pressure sensor 101 is disposed on the suction side of the compressor 1, and a suction pressure that is detected here is output to the controller 201. When a setting value is input at the setting device 202, the controller 201 displays that setting value on the setting display 203 and, based on the setting value and the detected value for suction pressure, also outputs a command signal to the solenoid valve 13 to control the degree of valve opening.

Next, the operation of the refrigerating apparatus of the present embodiment will be described.

High pressure gas refrigerant discharged from the compressor 1 is condensed by heat exchange with air blown from the cooling fan 9 at the condenser 2 to form high pressure liquid refrigerant, which is then stored in the liquid receiver 3. The liquid refrigerant at this time is close to saturation temperature and the supercooling temperature is an extremely low temperature of approximately 1° C. Therefore, a flush phenomenon due to re-evaporation is liable to occur if there is a large pressure loss in the refrigerant piping on the following flow side.

Liquid refrigerant that left the liquid receiver 3 is supercooled at the supercooling heat exchanger 4, and then introduced into the low-pressure side device II via the dryer 10 and sight glass 11. The refrigerant passes in this order through the solenoid valve 5, the expansion valve 6, and the evaporator 7 to be evaporated to form low pressure gas refrigerant. This low pressure gas refrigerant is subsequently drawn into the compressor 1 via the accumulator 8 to be compressed again and circulate through the refrigeration cycle.

One part of the liquid refrigerant that passed through the supercooling heat exchanger 4 and was supercooled is guided to the liquid introduction circuit 12. The liquid refrigerant that flows through the liquid introduction circuit 12 is decompressed via the solenoid valve 13 and the decompression device 14 to form decompressed refrigerant that is guided to the supercooling heat exchanger 4. The decompressed refrigerant that flows through the decompressed refrigerant exchanger tube **4*b* of the supercooling heat exchanger 4 is evaporated by heat exchange with high pressure liquid refrigerant flowing through the high pressure refrigerant heat exchanger tube 4*a*, whereby a degree of supercooling is applied to the high pressure liquid refrigerant. After expanded refrigerant that passed through the supercooling heat exchanger 4 is guided to the accumulator 8, it is returned to the compressor 1. Although according to the present embodiment the liquid introduction circuit 12 is connected to piping on the upstream side of the accumulator 8, this invention is not limited thereto, and for example a configuration may be adopted in which the liquid introduction circuit 12 is connected to the intermediate pressure part of the compressor 1 to directly introduce decompressed refrigerant into the intermediate pressure part of the compressor 1**.

In order for the high pressure liquid refrigerant that was guided into the liquid refrigerant circuit 15 to cool the compressor 1, the high pressure liquid refrigerant is introduced into the compressor 1 after being subjected to decompression adjustment at the decompression device 17 in order to obtain a predetermined amount of refrigerant. By introducing gas refrigerant from the liquid refrigerant circuit 15 into the compressor 1 in this manner, for example, it is possible to suppress an increase in the temperature of discharge gas of the compressor 1 and prevent a burn fault or the like.

Further, the reliability of the compressor 1 can be ensured by appropriately closing the solenoid valve 16 so that the temperature of the compressor 1 does not decrease excessively nor refrigerant does not flow into the compressor 1 during shutdown due to excess refrigerant flowing into the compressor 1 in a case where single adjustment of the decompression device 17 is not sufficient during operation. In this case, for example, a configuration may be adopted in which the temperature on the discharge side of the compressor 1 is detected, and opening and closing of the solenoid valve 16 is controlled in accordance with that discharge temperature.

The above described refrigeration cycle is configured such that the controller 201 appropriately adjusts the degree of valve opening of the solenoid valve 13 based on the suction pressure of the compressor 1 that is detected by the suction pressure sensor 101, to thereby control the flow of decompressed refrigerant flowing into the supercooling heat exchanger 4. In this case, for example, when the load or evaporation setting temperature of the evaporator 7 changes, the inverter driving frequency at the compressor 1 is adjusted as required to control the capacity. Thus, the circulating volume of refrigerant in the refrigeration cycle changes and the degree of supercooling changes therewith.

More specifically, according to the present embodiment, since the degree of valve opening of the solenoid valve 13 is controlled based on the circulating volume of refrigerant in the refrigeration cycle, even if the circulating volume of refrigerant varies it is possible to always control the high pressure liquid refrigerant in the refrigeration cycle to a desired degree of supercooling. It is therefore possible, for example, to suppress a flush phenomenon accompanying an increase in the circulating volume of refrigerant and to obtain a stable operating state and high operating efficiency. The circulating volume of refrigerant can be easily detected by a known method such as a flowmeter.

The degree of opening of the solenoid valve 13 may also be controlled based on, for example, the inverter driving frequency of the compressor 1 (based on the number of operating compressors in a case in which a plurality of compressors are provided) instead of the above described circulating volume of refrigerant.

Next, the control means of the liquid introduction circuit 12 will be described specifically based on the configuration of the above described refrigerating apparatus. In this connection, as the scroll type compressor 1 to be used in the refrigeration cycle, either a plurality of fixed capacity compressors which are provided in parallel, or at least one variable capacity-type inverter compressor in which the driving frequency is variable may be used.

In the controller 201, as the suction pressure of the compressor 1 to be determined based on the. internal cooling temperature, the evaporating temperature in the evaporator 7, and the internal temperature tolerance, for example, a shutdown pressure value (A value) for shutting down operation, a setting value (B value) for reducing the number of operating compressors or the operating frequency, and a setting value (C value) for increasing the number of operating compressors or the driving frequency are set in advance in accordance with the operating conditions and intended use of the refrigerating apparatus. Each setting value is set by means of the setting device 202 of the controller 201, and the setting value is displayed on the setting display 203. Thus, by controlling the flow rate of refrigerant that flows through the liquid introduction circuit 12 using the solenoid valve 13 or the decompression device 14 in accordance with the preset setting values (A value to C value) and the operating capacity of the compressor 1, it is possible to obtain stable operation and increased efficiency.

Figure 2:
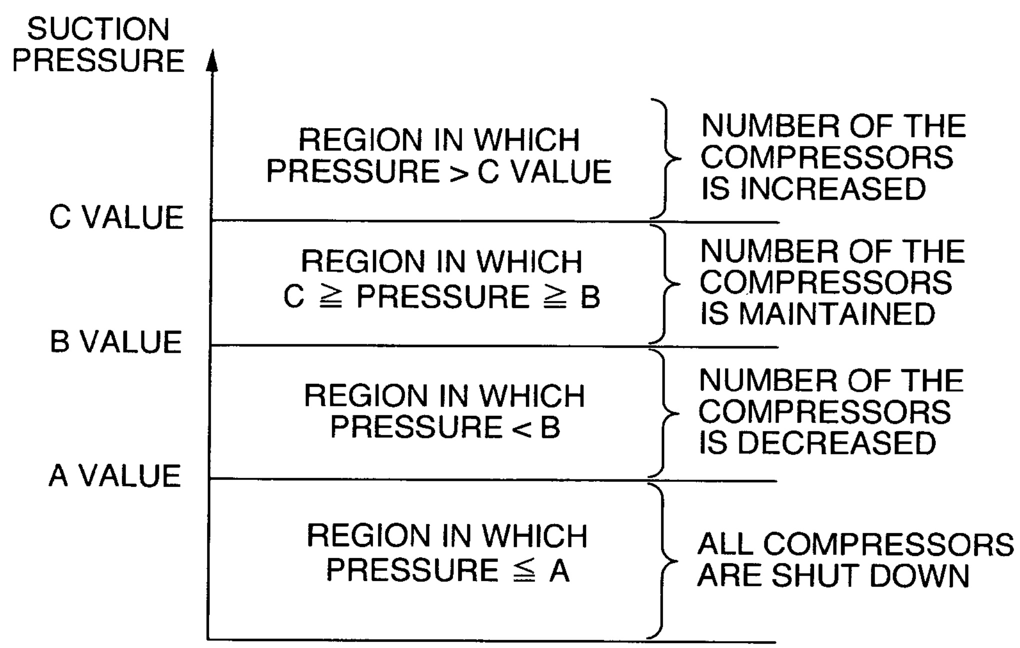
FIG. 2 is a diagram for explaining basic control of the number of operating compressors in a multi refrigerator that includes a plurality of compressors, which expresses the relation between compressor suction pressure and number of operating compressors.

FIG. 2 is a diagram for explaining basic control of the number of operating compressors in a multi refrigerator that includes a plurality of fixed capacity compressors 1, which expresses the relation between the suction pressure of the compressors 1 and number of operating compressors.

Suction pressure values (A value, B value, C value) for determining the driving and shutdown operations of the compressors 1 are preset within the controller 201 in accordance with the intended use of the refrigerating apparatus. And capacity control is carried out in which the number of operating compressors is varied by changing operation and shutdown (drive or stop) of the compressors 1 in accordance with a suction pressure value that is detected by the suction pressure sensor 101.

More specifically, the number of operating of compressors 1 is increased or decreased in accordance with the suction pressure detection value so that the suction pressure falls within a region in which the number of operating compressors is maintained. If the suction pressure is equal to or greater than B value and less than or equal to C value. In this case, when the suction pressure is greater than C value the apparatus determines that the required capacity is lacking and increases the number of operating compressors 1, and when the suction pressure is less than B value the apparatus determines that the required capacity is exceeded and decreases the number of operating compressors 1. Further, even in a situation where one unit of the compressors 1 is operating, if the suction pressure drops further to a value less than or equal to A value, all compressors are shutdown.

When the number of operating compressors 1 increases or decreases, the circulating volume of refrigerant will change significantly. More specifically, a setting value (B value) for reducing the number of operating compressors is preset in the controller 201 at the trial operation stage in accordance with the intended use of the refrigerating apparatus and the like, and although the circulating volume of refrigerant and evaporating temperature used are roughly decided by that setting value, for example, when the load capacity changes the circulating volume of refrigerant may vary significantly together with the suction pressure depending on the driving status of the compressors 1.

Therefore, a predetermined operating capacity, for example, a control value (C value) for increasing the number of operating compressors is set, and the solenoid valve 13 or decompression device 14 is controlled in accordance with this control value. Thus, by regulating the required heat transfer amount, i.e. the decompressed refrigerant amount, to be introduced into the supercooling heat exchanger 4 from the liquid introduction circuit 12 in response to changes in the circulating volume of refrigerant, the liquid refrigerant can be controlled to a desired degree of supercooling via the supercooling heat exchanger 4.

In the case of a refrigerating apparatus comprising an inverter compressor, referring to FIG. 2 it can be considered that by replacing B value with a frequency lowering setting value and replacing C value with a frequency increasing setting value, control that is the same as described above can be performed.

Next, the control configuration of the liquid introduction circuit 12 will be described for a case in which a multi refrigerator comprising a plurality of fixed capacity type compressors 1 is taken as the refrigerating apparatus having the above described configuration.

Pressure setting values for decreasing the number of operating compressors are set for the refrigerating apparatus in accordance with the intended use as described in the foregoing. Thus, the evaporating temperature in the evaporator 7 is determined and the target internal temperature can be retained.

FIG. 3 is a table which shows setting examples when pressure setting values (A value, B value, C value) of nine patterns are set for different purposes of use, and which expresses with or without performance of ON/OFF control for the solenoid valve 13 in the liquid introduction circuit 12 at that time.

In general, the evaporating temperature of the evaporator 7 is determined by the B value (setting value to decrease the number of operating compressors or frequency) in the table. That is, the lower this value is, the lower the internal evaporating temperature will be. In this case, the lower the evaporating temperature is, the greater the decrease in the circulating volume of refrigerant in the refrigeration cycle and the greater the reduction in pressure loss will be, making it difficult for a flush phenomenon to occur. Consequently, under conditions in which the B value is low, flow control of the liquid introduction circuit 12 is unnecessary. In FIG. 3, it is determined that flow control is required for Nos. 1 to 6 as cold storage areas and control is therefore performed for the solenoid valve 13 in the liquid introduction circuit 12. Further, it is determined that flow control is not required for Nos. 7 to 9 as freezer storage areas, and thus control is not performed for the solenoid valve 13.

In this case, when applying control by setting values to the decompression device 14 and using an electronic expansion valve as the decompression device 14, it is possible to perform even more minute control by determining the degree of valve opening for each setting value (B value).

In a refrigerating apparatus comprising a variable capacity-type inverter compressor, it is possible to perform the same control as described above if we consider replacing the above described B value with a frequency lowering setting value.

Next, another control configuration for the liquid introduction circuit 12 in the above described multi refrigerator will be described.

FIG. 4 is a table showing the with or without performance of ON/OFF control of the solenoid valve 13 according to the number of operating compressors. In a multi refrigerator comprising a plurality of compressors 1, since the circulating volume of refrigerant in the refrigeration cycle will vary greatly by changing the number of operating compressors 1, the required heat transfer amount, i.e. the amount of decompressed refrigerant, introduced into the supercooling heat exchanger 4 from the liquid introduction circuit 12 will change in response thereto.

Therefore, for example, when the total operating capacity of the compressors 1 during operation is 50% or more of the overall operating capacity (in the case of three compressors, operation of two or more of the three compressors), it is determined that flow control is required and control of the solenoid valve 13 in the liquid introduction circuit 12 is performed (open). In contrast, when the total operating capacity is less than 50% (in the case of three compressors, operation of one or less of the three compressors), it is determined that flow control is not required and control of the solenoid valve 13 is not performed (close).

In this case, when applying control by means of the number of operating compressors to the decompression device 14 and using an electronic expansion valve as the decompression device 14, it is possible to perform even more delicate control by determining the degree of valve opening according to the total capacity of the compressors in operation.

Further, in a refrigerating apparatus comprising an inverter compressor, the same control as described above can be performed when we consider replacing the number of operating compressors with a frequency lowering setting value.

As described in the foregoing, according to the refrigerating apparatus of the present embodiment, for example, even if the circulating volume of refrigerant increases when the refrigeration load increases or when using the apparatus for a cold storage purpose (high evaporating temperature zone), the degree of supercooling of the liquid refrigerant can be stably ensured. It is therefore possible to solve problems such as overfilling refrigerant when conducting work to fill refrigerant, an excessive rise in the temperature of discharge gas, or a noticeable decline in refrigerating capacity due to generation of flush gas caused by an increase in the circulating volume of refrigerant.

Conversely, since the degree of supercooling of liquid refrigerant can be stably ensured in the same manner even if the circulating volume of refrigerant decreases, it is possible to solve problems such as a drop in heat exchange efficiency in the supercooling heat exchanger 4 due to a decrease in the circulating volume of refrigerant, a drop in the degree of superheating of suction gas and degree of superheating of discharge gas, a freeze burst or refrigerant gas leak caused by supercooling by the supercooling heat exchanger, and generation of abnormal noise due to an excessive amount of refrigerant being introduced from the liquid introduction circuit 12 into the intake pipe inlet or the intermediate pressure chamber inlet of the compressor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A refrigerating apparatus comprising:

a refrigeration cycle having one or more compressors or one or more inverter compressors, a condenser, an expansion valve and an evaporator;

a liquid introduction circuit that, after guiding decompressed refrigerant that is obtained by extracting one part of high pressure liquid refrigerant from the refrigeration cycle and decompressing, to a supercooling heat exchanger provided in the refrigeration cycle and causing the decompressed refrigerant to experience heat transfer with the high pressure liquid refrigerant, introduces the decompressed refrigerant into refrigerant to be drawn into the compressors or the inverter compressor or an intermediate pressure part of these compressors;

control means that controls shutdown of the compressors or a driving frequency of the inverter compressor based on a detection value for the suction pressure with respect to a pressure setting value for suction pressure of the compressors or the inverter compressor; and flow control means that controls a flow amount of the high pressure liquid refrigerant flowing through the liquid introduction circuit based on a circulating volume of refrigerant in the refrigeration cycle.

2. The refrigerating apparatus according to claim 1, wherein the pressure setting value is determined on the basis of an evaporating temperature for the evaporator.

3. The refrigerating apparatus according to claim 1, wherein HFC-type quasi-azeotropic mixture refrigerant is filled into the refrigeration cycle.

4. A refrigerating apparatus comprising:

a refrigeration cycle having a plurality of compressors or one or more inverter compressors, a condenser, an expansion valve and an evaporator;

a liquid introduction circuit that, after guiding decompressed refrigerant that is obtained by extracting one part of high pressure liquid refrigerant from the refrigeration cycle and decompressing, to a supercooling heat exchanger provided in the refrigeration cycle and causing the decompressed refrigerant to experience heat transfer with the high pressure liquid refrigerant, introduces the decompressed refrigerant into refrigerant to be drawn into the compressors or the inverter compressor or an intermediate pressure part of these compressors;

control means that controls shutdown of the compressors or a driving frequency of the inverter compressor based on a detection value for the suction pressure with respect to a pressure setting value for suction pressure of the compressors or the inverter compressor; and flow control means that controls a flow amount of the high pressure liquid refrigerant flowing through the liquid introduction circuit in accordance with shutdowns of the compressors or a driving frequency of the inverter compressor.

5. The refrigerating apparatus according to claim 4, wherein the pressure setting value is determined on the basis of an evaporating temperature for the evaporator.

6. The refrigerating apparatus according to claim 4, wherein HFC-type quasi-azeotropic mixture refrigerant is filled into the refrigeration cycle.

* * * * *